United States Patent
Ma et al.

(10) Patent No.: US 8,648,020 B2
(45) Date of Patent: *Feb. 11, 2014

(54) PRESSURE PROCESS FOR OVERBASED MAGNESIUM OXIDE DISPERSIONS

(75) Inventors: Qinggao Ma, Middlebury, CT (US); Mitchel Cohn, West Haven, CT (US)

(73) Assignee: Chemtura Corporation, Middlebury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/456,721

(22) Filed: Apr. 26, 2012

(65) Prior Publication Data

US 2013/0005620 A1    Jan. 3, 2013

Related U.S. Application Data

(60) Provisional application No. 61/502,914, filed on Jun. 30, 2011.

(51) Int. Cl.
  *C10M 169/04* (2006.01)
  *C10M 159/24* (2006.01)
  *C10M 169/00* (2006.01)

(52) U.S. Cl.
  USPC .............................. 508/154; 508/391; 508/523

(58) Field of Classification Search
  USPC .................................. 508/154, 391, 460, 523
  See application file for complete search history.

(56) References Cited

U.S. PATENT DOCUMENTS

| | | | |
|---|---|---|---|
| 4,056,479 A | 11/1977 | Redmore et al. | |
| 4,129,589 A | 12/1978 | Eliades et al. | |
| 4,163,728 A | 8/1979 | Cheng et al. | |
| 4,293,429 A * | 10/1981 | Cheng et al. | 508/178 |
| 6,197,075 B1 * | 3/2001 | Muir et al. | 44/373 |
| 2012/0015853 A1 * | 1/2012 | Ma et al. | 508/154 |

* cited by examiner

*Primary Examiner* — Prem C Singh
*Assistant Examiner* — Francis C Campbell
(74) *Attorney, Agent, or Firm* — Joseph Suhadolnik

(57) ABSTRACT

Overbased MgO dispersions with high magnesium content and acceptably low viscosities are prepared without gel formation by heating to 280-360° C. under high pressure in a sealed reactor a mixture of MgO, selected dispersants, low MW carboxylic acids, water and a hydrocarbon solvent having a boiling point below 280° C. No additional solubilizing or dispersing agents, promoters or reactants such as carbon dioxide, amines, alcohols etc are needed to obtain the desired dispersions. Compositions such as lubricating oils and fuels containing the overbased magnesium dispersions as additives are also disclosed.

4 Claims, No Drawings

PRESSURE PROCESS FOR OVERBASED MAGNESIUM OXIDE DISPERSIONS

This application claims benefit under 35 USC 119(e) of U.S. provisional application No. 61/502,914, filed Jun. 30, 2011, the disclosure of which is incorporated by reference.

Flowable compositions comprising stable dispersions of overbased magnesium oxide with high magnesium content are prepared by heating under pressure a mixture of magnesium oxide, sulfonic or carboxylic acid dispersant such as an alkylbenzene sulfonic acid, $C_{1-5}$ carboxylic acid and water to 280-360 ° C. in a solvent with a boiling point of less than 280° C.

BACKGROUND OF THE INVENTION

Petroleum fuels such as residual fuel oils contain large amounts of impurities which result in corrosive deposits in the equipment. For example, crude oil usually contains 1-500 ppm of vanadium in the form of a porphyrin complex depending on the source. Because of its origin as a concentrate from the refining process, residual oil contains several times more vanadium than the crude from which it was derived. The combustion of these vanadium-containing fuels produces very corrosive deposits which can destroy a metal part, such as a gas turbine blade, in a matter of hours.

The presence of sodium in fuel can also have catastrophic consequences. For example, in maritime use the sodium level can be increased because of the introduction of sodium chloride through the air intake and contamination of the fuel by sea water. During combustion, the sodium can react with sulfur in the fuel to form a sulfate which is deposited in turbine parts.

Overbased detergents, e.g., overbased alkaline metal or alkaline-earth metal compounds, are well known additives for lubricating oil compositions and petroleum fuels. These detergents perform a variety of functions including anti-corrosion, deposit control, acid scavenger functions and in general comprise overbased metal compounds complexed with an organic dispersant. For example, overbased magnesium compounds complexed with sulfonate and carboxylate dispersants, have long been used as anti-corrosion and acidic neutralization additives for lubricating oils and greases, anti-corrosion and acidic neutralization additives during the combustion of fuels such as residual fuel, pulverized sulfur-containing coal, corrosion inhibitors in fuels containing vanadium etc. The addition of overbased magnesium detergents to, for example, boiler fuels or gas turbine fuels, is known to reduce corrosion, presumably by forming magnesium complexes with the vanadium or sodium.

Overbased metal detergents are also added to lubricating oils to prevent or remove deposits of oil-insoluble sludge, varnish, carbon and lead compounds which otherwise form on internal combustion engine parts and for combating severe rust conditions which may be encountered during shipping or storage of machinery or exposure to out-door weather. Detergent additives for automotive and diesel engine oils also react chemically with the highly acidic by-products of combustion that find their way into the lubricating oil system.

Obviously the dispersion must be stable during storage and the overbased metal must stay well dispersed in the lubricant or fuel. A variety of parameters will affect the stability and activity of these dispersions such as the dispersants and carriers employed, particle size of the solid components, and the relationship between metal and dispersant. The process by which the overbased metal compounds and complexes are prepared will greatly influence the actual physical make up and properties of the overbased metal dispersion, impacting particle size and distribution of the metal compound throughout the dispersion, the viscosity and stability of the dispersion, the amount of the metal within the dispersion etc.

Overbased metal additives, for example, overbased MgO dispersions, are typically added as a dispersion in an appropriate carrier, often in a high boiling liquid hydrocarbon. Part of the rationale for supplying MgO dispersions in high boiling carriers, i.e., carriers with boiling points over 280° C., typically much over 300° C. is due to the manner in which the dispersions are made. For example, overbased stable MgO dispersions with fine particle sizes and good flowability are typically produced, even when starting with MgO as a starting material, through thermal decomposition of $Mg(OH)_2$ or $Mg(OH)_2$ derived intermediates which require high temperature (300-350° C.). Thus, the use of high boiling point solvents as carriers is dictated by practical processing considerations.

U.S. Pat. No. 4,163,728, discloses stable, fluid magnesium-containing dispersions prepared by the high temperature decomposition of magnesium salts of carboxylic acids to MgO in a dispersant-containing fluid. In the process, $Mg(OH)_2$, an organic carboxylic acid or sulfonic acid surfactant such as naphthenic acid, acetic acid and water are heated in a high boiling hydrocarbon to temperatures up to 350° C., which is above the decomposition point of magnesium acetate, 323° C. It is believed that magnesium acetate is formed in situ and decomposes at the high temperatures used. Water is also removed at the elevated temperatures.

U.S. Pat. No. 4,293,429, discloses a variation of U.S. Pat. No. 4,163,728 which begins with MgO instead of $Mg(OH)_2$. In the process, the bulk MgO is converted to magnesium acetate which forms suspended MgO particles of less than 5 microns, and preferably less that 1 micron. Thus, the coarse MgO particles are converted into a dispersion of stabilized micro MgO particulates. It is also disclosed that similar processes using lower temperatures fail to provide the fine particle size MgO.

U.S. Pat. No. 4,056,479, discloses a fuel additive for reducing sediment in vanadium-containing fuels comprising a magnesium-alkoxide-carbonate complex in combination with an oil soluble sulfonate and a carboxylate and/or phenate dispersing agent. While the product has a magnesium content of about 12.5% to about 14.6%, it also tends to have undesirably high viscosities.

U.S. Pat. No. 4,129,589, discloses a process for preparing an over-based oil-soluble magnesium salt of a sulfonic acid by contacting carbon dioxide gas with a mixture comprising an oil-soluble magnesium salt of a sulfonic acid, magnesium oxide, water, and a promoter system comprising a carboxylic acid of 1 to 5 carbons in an inert solvent for lowering the viscosity of said mixture to facilitate mixing. The products of U.S. Pat. No. 4,129,589 had acceptably low viscosity but the magnesium content was typically 9-10% and no more than 14%.

U.S. Pat. No. 6,197,075, discloses an overbased magnesium sulfonate, carboxylate or phenate product containing at least 14% and up to about 18% by weight of magnesium, and a succinic anhydride and lower carboxylic acid co-promoter reaction product, useful as a deposit control additive for residual fuel oils and turbine fuels. The process for preparing the overbased magnesium product comprises contacting a mixture of i) a sulfonic acid, phenol or carboxylic acid or salt thereof, ii) a magnesium oxide, iii) a co-promoter comprising a lower carboxylic acid, a lower alcohol, a succinic anhydride and water, and iv) a solvent and/or oil, with an acidic gas such as carbon dioxide at 50° F. up to the reflux temperature of the mixture to overbase the reaction mixture.

The overbased metal compositions described above and elsewhere are best described as products by process as there is typically no simple chemical formula which adequately correlates to the essential material makeup and the physical properties of the product. Often, the molecular structures of the metal complexes are not fully known and are not a critical aspect of the invention. For example, two compositions containing compounds with the same chemical formula in the same amounts and differing only by the manner in which they were prepared can have very different physical properties.

While the use of high boiling solvents or carriers in the above processes can provide useful dispersions, there is the need for improved products and methods. For example, MgO dispersions with a higher magnesium content are desirable. However, attempts to modify known procedures to obtain overbased detergents with high metal content have met with unforeseen drawbacks including unacceptably high viscosities and gelling. Also, attempts to concentrate the dispersion by distillation to get higher Mg content must be carried out at very high temperatures or reduced pressure.

Co-pending application U.S. Ser. No. 13/167,127 describes one approach to obtaining free flowing MgO dispersions with high Mg content in high boiling carriers.

Alternate and flexible approaches to preparing MgO dispersions with high Mg content are still desirable. It has been found, as described herein, that performing some of the processing steps in the preparation of the MgO dispersions under increased pressure will allow one to prepare MgO dispersions in lower boiling solvents even when using the high temperatures required for conversion of the $Mg(OH)_2$ or $Mg(OH)_2$ derived intermediates.

SUMMARY OF THE INVENTION

The present invention provides a method to produce high magnesium content overbased product, for example MgO/sulfonate dispersions, under pressure using solvents with boiling points below 280° C., e.g., solvents with boiling points below 250° C., in some embodiments below 225° C., such as solvents with boiling points from about 100 to about 225° C. The process comprises preparing a mixture of MgO, selected dispersants, low MW carboxylic acids and water in a solvent, such as a hydrocarbon solvent, in a reactor capable of being used under increased pressure, sealing the reactor and heating the mixture to 280-360° C., for example a maximum of about 350 psig may be reached, and removing water.

No additional solubilizing or dispersing agents, promoters or reactants such as carbon dioxide, amines, alcohols etc are needed to obtain the desired product and the Mg content can be readily increased if desired by a simple distillation. This allows for greater flexibility in processing, for example, excess solvent can be used to improve stirring of the reaction mixture and then removed to provide the desired concentration once the product is formed. It is also possible modify the carrier by, for example, adding a higher boiling carrier and distilling away the reaction solvent.

Magnesium oxide dispersions with up to 40 or 50 weight % magnesium based on the total weight of the dispersion can be prepared and higher concentrations are available in part due to the ease of solvent, i.e., dispersion carrier, distillation. For example, magnesium contents of 10%, 15%, 20%, 30%, 35%, 40% and higher can be prepared. As stated before, a specific chemical formula for the composition of the dispersion is not fully descriptive of the product, and the molecular structures of the magnesium complexes of this invention are not fully known, however, the product obtained is a free flowing dispersion of predominately submicron MgO particles engulfed by and complexed to a sulfonate or carboxylate dispersant. Other magnesium compounds such as traces of magnesium hydroxide are also believed to be present.

The dispersions are stable and free flowing and can be used as formed or further modified and can be used as an additive in fuels, lubricating oils, for example, petroleum based fuels and lubricants, anti corrosive paints and as part of any formulation containing similar materials.

DESCRIPTION OF THE INVENTION

The invention provides a process for producing a composition useful as an additive in lubricating oils or petroleum fuels, the composition being a stable flowable overbased magnesium oxide dispersion with a magnesium content of 10-50%, e.g. 10-40%, typically higher than 14%, for example 15-40%, 15-35%, 20-40% or 25-35%, by weight based on the total weight of the composition. The process comprises heating a mixture of a mixture of magnesium oxide, i.e., MgO, water, a sulfonic or carboxylic acid dispersant such as an alkylbenzene sulfonic acid, a $C_{1-5}$ carboxylic acid, and a hydrocarbon solvent with a boiling point of less than 280° C. to temperatures of 280-360° C. under pressures of up to about 350 psig with removal of water, wherein the dispersant and $C_{1-5}$ carboxylic acid are present in less than one molar equivalent relative to the magnesium oxide. Typically the reaction mixture before heating contains more than 8% and often at least 10% by weight of water based on the total weight of the reaction mixture.

The process is conveniently carried out in a sealed reactor equipped with a Dean Stark trap, liquid/liquid extractor or other such device for removing water from the reaction. While temperatures of 280° C. and higher are necessary to complete the process, the heating is often carried out in stages with the pressure increasing along with the temperature.

For example, the reaction components can be readily combined under standard atmospheric pressure and heating, for example, up to temperatures of up to about 150° C., e.g., up to about 100° C. may be applied to aid in dispersing the reactants. This preliminary heating is entirely optional and can be carried out at atmospheric pressure or can be carried out after the reaction vessel is sealed allowing the pressure therein to rise and may take several minutes or more, e.g., 0.2 to about 1.5 hours but usually less than 1 hour. The vessel, if not already sealed, would be sealed and the reaction would then be heated further to reach 280-360° C. under increasing pressure.

In addition to any optional heating applied during the original mixing of the reaction components, the reaction may also be held at an intermediate temperature, for example, a temperature of 100-280° C., more typically a temperature of from about 150-250° C. or from about 170-220° C., for a period of time, e.g., about 0.5 to about 5 hours, or from about 0.5 to about 2 or 3 hours, during which time water may be removed. Heating at this intermediate temperature is most generally performed in a sealed reactor under increased pressure and in many cases, pressure may be needed to attain the desired intermediate temperature, e.g., when the solvent boils below the desired temperature.

In order to complete the process the reaction is heated to 280-360° C. an held until all the water is removed. In order to achieve these temperatures with the solvent with a by of less than 280° C., pressure of up to about 350 psig is employed. In the process, the reactor is sealed and the increase in pressure is due to the heating of the sealed reactor and the exact pressure reached will be dependent on factors such as the by of the solvent being used.

The obtained dispersion can be stored and used as is. It can be modified, e.g., by distilling of excess solvent, adding further components etc. It is also possible to further purify the dispersion by diluting with solvent, such as a light hydrocarbon, and then allowing the product to settle or subject it to centrifuge. Any coarse, large particles will settle out, however, this is typically minimal and is not required in most cases.

The process prevents the formation of a gel and the product obtained is a free flowing dispersion of submicron particles. Dispersed MgO particles with an average particle size of 1 micron or less and an average particle size of 500 nm is typically obtained. Often an average particle size of 1-500 nm, for example, 1-100 or 10-50 nm are obtained and in certain embodiments, an average particle size is 1-20 nm is possible.

Many types and sources of magnesium oxide can be used as a starting material, most frequently, a commercial magnesium oxide in the light or active form is employed. The amount of magnesium oxide used is dependent upon the amount of metal desired in the final product as known in the art.

In the process, there is less than a molar equivalent, relative to MgO, of the dispersant and the $C_{1-5}$ carboxylic acid, often much less than a molar equivalent, but there can be significantly more than a molar equivalent of water added.

For example, in the present invention, the reaction mixture contains at least 8%, typically at least 10% by weight of water, based on the total weight of the mixture, and typically 12% or more. In certain embodiments, the amount of water is comparable by weight to the amount of MgO and in some particular embodiments, the weight of water is higher than the amount of MgO. In terms of molar equivalents relative to MgO, the reaction mixture contains from about a 5:1 to 1:1 molar ratio of water to MgO, for example, from about 3:1 to 1:1. Ratios of from 2.5:1 to 1:1, or from 2:1 to 1:1 are common, such as 1.5, 1.8, 2, 2.2 and 3 molar equivalents of water relative to MgO can be employed. The process can also be used to prepare MgO dispersions starting with $Mg(OH)_2$ instead of MgO, but in that case, less water is typically added.

The $C_{1-5}$ carboxylic acid can be any such acid, for example, acetic acid, propionic acid, butyric acid, pentanoic acid; excellent results have been obtained using acetic acid. A small amount of this acid relative to MgO is employed in the reaction, for example, the molar ratio of MgO to $C_{1-5}$ carboxylic acid is from about 100:1 to 2:1, for example, from about 50:1 to about 5:1, or from about 30 to 1 to 10:1, such as a molar ratio of MgO to $C_{1-5}$ carboxylic acid of about 20:1.

The dispersant is a sulfonic acid or carboxylic acid. Mixtures of dispersants may be used including mixtures of sulfonic acids, mixtures of carboxylic acids or mixtures including both sulfonic and carboxylic acids. Excellent results have been obtained using sulfonic acid dispersants widely known by those skilled in the art as oil-soluble sulfonic acids.

For example, sulfonic acid dispersants be derived from natural petroleum fractions or various synthetically prepared sulfonated compounds. Typical oil-soluble sulfonic acids which may be used include: alkane sulfonic acids, aromatic sulfonic acids, alkaryl sulfonic acids, aralkyl sulfonic acids, petroleum sulfonic acids such as mahogany sulfonic acid, petroleum sulfonic acid, paraffin wax sulfonic acid, petroleum naphthene sulfonic acid, polyalkylated sulfonic acid, and other types of sulfonic acids which may be obtained by fuming sulfuric acid treatment of petroleum fractions. In one embodiment, an alkaryl sulfonic acid, i.e., an alkylbenzene sulfonic acid, is used as dispersant with excellent results.

Carboxylic acid dispersants which may be used in some embodiments are also well known in the art. The carboxylic acid dispersants are not the same as the $C_{1-5}$ carboxylic acid required for the invention as the dispersants have more than 5 carbon atoms, typically much more than 5 carbon atoms. Some examples include, lauric, myristic, palmitic, stearic, isostearic, archidic, behenic and lignoceric acids; aromatic acids such as alkyl salicylic acids. Mixtures of carboxylic acids include commercial grades containing a range of acids, including both saturated and unsaturated acids. Such mixtures may be obtained synthetically or may be derived from natural products, for example, tall, cotton, ground nut, coconut, linseed, palm kernel, olive, corn, palm, castor, soybean, sunflower, herring and sardine oils and tallow.

In many embodiments of the invention, the dispersant is a naturally occurring or synthetic sulfonic acid. Excellent results have been obtained using, for example, alkyated arylsulfonic acids, for example, alkylated benzenesulfonic acids. In general, the sulfonic acid dispersant will have a MW of 300 or higher, often 350 or higher, for example 400 or higher. Mixtures of sulfonic acids may be used, for example, alkylated benzene sulfonic acids may be mono-alkylated, di-alkylated or mixtures of mono- and di-alkylated compounds may be used and in some embodiments, benzene sulfonic acid may be alkylated by alkyl chains of varying lengths. In such cases, the MW is the number average molecular weight. For example, excellent results have been obtained using alkyated benzene sulfonic acids with an average MW of from about 350 to 1000.

In general, a molar ratio of MgO to dispersant of from about 10:1 to 200:1 is employed in the reaction, frequently the ratio is from about 20:1 to 200:1. In certain embodiments the molar ratio of MgO to surfactant is from about 20:1 to 100:1 or from about 25:1 to 50:1.

In many embodiments, the molar ratio of MgO to $C_{1-5}$ carboxylic acid, for example acetic acid, is from about 50:1 to about 5:1 or from 30:1 to 10:1 and the molar ratio of MgO to dispersant, for example, an alkylated sulfonic acid, is from about 20:1 to 100:1 or from about 25:1 to 50:1.

The hydrocarbon solvent with a boiling point below 280° C. is an inert solvent which does not interfere with the overbasing process. For example, well known aliphatic or aromatic hydrocarbons with boiling points ranging from about 80° C. to about 280° C., for example, boiling points ranging from about 100° C. to about 250° C. or from about 150° C. to about 225° C. and mixtures thereof are conveniently used, including linear and cycloaliphatic compounds, aromatic hydrocarbons and alkylated aromatic hydrocarbons such as alkylated benzenes, tetralin and the like.

It is possible to include a high boiling hydrocarbon carrier, e.g., having a boiling point of 280° C. or higher, however, the amounts of such materials present during the process will be low, in general less than 25% by weight of the reaction mixture, typically 10% or less and are often excluded altogether. Examples of high boiling hydrocarbons include for example, mineral oils, oligomers or polymers of alpha olefins, polycyclic aromatics and alkylated derivatives thereof, long chain alkanes including waxes and other similar natural or synthetic materials. Of course, in the event that one or more of the optional high boiling hydrocarbon is present during the process to prepare the dispersion, the concentration of said high boiling hydrocarbon can be increased by subsequent distillation of the low boiling solvent.

In the process, each of the components are mixed together, generally under ambient conditions, i.e., room temperature or slight heating and atmospheric pressure, and the mixtures may be heated, in a sealed or unsealed reactor, with stirring or other agitation until the water, acid and dispersant bring the MgO into a uniform, light suspension. The reactor, if unsealed, is sealed and the temperature is raised to 280-360° C., typically temperatures of 300-340° C. are reached, and the water is removed, e.g., via Dean Stark trap, liquid/liquid extractor etc. The pressure in the reactor rises as heat is applied, but typically does not exceed about 350 psig. Heating and mixing under pressure are continued until all the water is removed, the amount of water collected is measured to ensure completion, and the mixture is allowed to cool.

As mentioned before, in some embodiments, water is removed at temperatures lower than 280° C., but full reaction and removal of all water is best completed at temperatures above 280° C., for example 300-340 °C. For example, in one embodiment, upon combining all components and optionally stirring at about 100° C. to obtain an appropriate initial suspension, the mixture is heated in a sealed reactor with increasing pressure to an intermediate temperature, e.g., between 120 and 220° C. during which time water is removed, after which the reaction mixture is heated to 280-360° C. to ensure complete reaction and removal of water.

In preparing the inventive dispersion, no acidic gas is passed through the mixture of MgO, dispersant, carboxylic acid, water and hydrocarbon. While alcohols are known as promoters in similar processes, it is found that their presence in the instant process is not necessary and may slow the reaction if present in appreciable amounts. For example, in many of embodiments of the invention, the reaction is carried out in the presence of less than 10% by weight of components other than the MgO, dispersant, $C_{1-5}$ carboxylic acid, water and hydrocarbon, e.g., 0-10%, 0-5% or 0-2% other components are added. In one particular embodiment, no alcohols, amines or phosphorous compounds are added to the reaction mixture.

The product of the process and the process itself represent embodiments of the invention. While molar ratios cited above describe aspects of the invention, the practical aspects of the invention are more fully defined by physical amounts, i.e., weight, of the individual components used. Thus, a general process for carrying out many embodiments of the invention is as follows, percentages unless otherwise stated are weight percent based on the weight of total of the mixture or composition:

a mixture of
2-15% of a dispersant having a MW of 300 or higher, for example an alkylbenzene sulfonic acid,
5-40% of MgO,
8%-30% of water,
1-10% of a carboxylic acid, e.g., acetic acid,
0-20% of a high boiling hydrocarbon carrier,
30-80% of a hydrocarbon solvent with a boiling point below 280° C., for example a boiling, for example, boiling a point ranging from about 100° C. to about 250° C. or from about 150° C. to about 225° C., typically selected from linear and cycloaliphatic compounds, aromatic hydrocarbons and alkylated aromatic hydrocarbons such as alkylated benzenes, tetralin and the like, for example, aromatic and alkylated aromatic hydrocarbons, is stirred and heated in a sealed reactor at temperatures between from about 150-250° C. for 0.25 to 5 hours, typically 0.5 to 4 hours, for example 1 to 3 hours, and then heated to over 280° C., typically between 300 and 360° C., for example, 300-340° C. until all the water is removed. The resulting mixture is allowed to cool yielding the inventive dispersion. The product produced by the inventive process comprises the MgO/dispersant product and hydrocarbon solvent and is bright and clear with very little to no sediment.

In one embodiment, the overbased magnesium oxide dispersion is produced from a mixture of MgO, a mixture of alkylated benzene sulfonic acids such as a mixture comprising benzene sulfonic acids substituted with alkyl chains of from 14 to 24 carbon atoms, e.g., 18 to 24 carbon atoms, acetic acid, water.

In some embodiments the mixture which is heated in the sealed reactor comprises:
2-15%, for example 3-10%, for example 5-10% of a dispersant having a MW of 300 or higher, for example an alkylbenzene sulfonic acid,
10-40%, for example, 10-35%, for example 15-30% of MgO,
8%-30%, for example, 10-20% or 12-18% water
1-10%, for example 1-5%, for example 1-4% of a carboxylic acid, e.g., acetic acid
0-20% of a high boiling hydrocarbon carrier
30-70%, for example 35-60%, for example 40-60%, of the hydrocarbon solvent.

While holding the reaction at a temperature below 280° C. is typically employed, the practitioner may choose to simply seal the reactor and ramp the heat up to 280-360° C. without holding at a lower temperature.

The invention is very valuable for the production of dispersions with a wt % of magnesium of greater than 14%, for example, dispersions wherein the wt % of magnesium is 20% or higher. In a particular embodiment, MgO dispersions comprising 20-50% magnesium are prepared such as those containing about 20-40%, 25-40% or 25-35% magnesium.

The overbased magnesium containing dispersion can be used as an additive in fuels, lubricating oils, anti corrosive paints and as part of any formulation containing similar materials. For example, the dispersion is used as an additive in petroleum based lubricants and fuels. The typical uses and dose levels are found in the art cited above, additional additive art not previously cited such as U.S. Pat. No. 4,094,801, incorporated herein in its entirety by reference, standard texts and other commercial literature. For example, when used as a lubricant additive, the product of the inventive process is added in an amount of 1-40%, for example 1-20%, and typically at least 2% or 5% by weight based on the amount of magnesium present in the final composition. Less is typically added to fuels; for example less than 2% and typically less than 1%, for example 1-2,000 ppm often 1-1,000 ppm or 1-100 ppm by weight based on the amount of magnesium present in the final composition. When part of a fuel, lubricating oil or other commercial composition, other standard additives common to fuels or lubricants will obviously also be present.

Once the dispersion is prepared, the product of the present invention can be further processed if desired, or additional materials such as co-additives such as other dispersants, buffers etc, solvents, oils and the like can be added.

EXAMPLES

Example 1

To a 500 mL stainless steel reactor with steel tube deanstark trap is added MgO (98%) (29.3 g), alkylbenzene sulfonic acid (12.0 g), Aromatic 150 (100.0 g, boiling point 183-205° C.), water (30.0 g), and glacial acetic acid (6.2 g), under ambient conditions. The reactor is sealed, purged with nitrogen and stirred while heating to 200° C. at which temperature the reactor is held for 1 hr. The mixture is then heated to 350° C. using Dean-Stark trap to remove all water. The pressure rises but does not exceed 350 psig.

The mixture is cooled room temperature to yield a bright and clear reaction product, with a Mg % content of about 12%; residue solid by thermogravimetric Analysis (TGA) at 1000° C. is about 20%; the average particle size measured by light scattering is less than 100 nm.

The product could be further concentrated by further collecting the refluxing solvent or reducing the pressure to strip some of the solvent to 35% Mg % and still remain fluid.

What is claimed:

1. A process for preparing a stable, free flowing overbased magnesium oxide dispersion with a magnesium content of 25 to 35% by weight based on the total weight of the dispersion, prepared by heating a reaction mixture comprising
   2-15% of an alkylbenzene sulfonic acid dispersant having a MW of 300 or higher,
   10-40% of MgO,
   10%-20% of water,
   1-10% of a $C_{1-5}$ carboxylic acid,
   0-20% of a hydrocarbon carrier having a boiling point of 280° C. or higher selected from mineral oils, alkylated benzenes, oligomers or polymers of alpha olefins, polycyclic aromatics, alkylated derivatives of polycyclic aromatics and waxes,
   30-80% of an alkylated aromatic organic solvent with a boiling point range from about 100° C. to about 250° C. selected from alkylated aromatic hydrocarbons,
   to an elevated temperature of 280-360° C. in a sealed reactor at, pressures of up to about 350 psig at which elevated temperature all water is removed wherein no acidic gas is passed through the mixture of MgO, dispersant, $C_{1-5}$ carboxylic acid , water, and alkylated aromatic organic solvent.

2. The process according to claim 1 wherein the reaction mixture comprises consists of the magnesium oxide, alkylated benzene sulfonic dispersant, acetic acid, water and alkylated aromatic organic solvent.

3. The process according to claim 1 wherein the reaction mixture is heated in a sealed reactor at temperatures between from about 150-250° C. for 0.25 to 5 hours and then heated to temperatures of from 280-360° C. until all the water is removed.

4. The process according to claim 2 wherein the reaction mixture is heated in a sealed reactor at temperatures between from about 150-250° C. for 0.25 to 5 hours and then heated to temperatures of from 280-360° C. until all the water is removed.

* * * * *